(12) United States Patent
Fehrenbacher

(10) Patent No.: US 6,545,381 B1
(45) Date of Patent: Apr. 8, 2003

(54) SMALL ELECTRIC MOTOR WITH AXIAL BEARING

(75) Inventor: Wolfgang Fehrenbacher, St. Georgen (DE)

(73) Assignee: Papst-Motoren GmbH & Co. KG, St. Georgen (DE)

(*) Notice: Subject to any disclaimer, the term of this patent is extended or adjusted under 35 U.S.C. 154(b) by 0 days.

(21) Appl. No.: 10/031,507

(22) PCT Filed: Jul. 15, 2000

(86) PCT No.: PCT/EP00/06763

§ 371 (c)(1),
(2), (4) Date: Jan. 15, 2002

(87) PCT Pub. No.: WO01/06620

PCT Pub. Date: Jan. 25, 2001

(30) Foreign Application Priority Data

Jul. 17, 1999 (DE) .................... 299 12 530 U

(51) Int. Cl.$^7$ .................... H02K 5/16; H02K 7/08
(52) U.S. Cl. .................... 310/90; 310/90.5
(58) Field of Search ........... 310/90, 90.5; H02K 5/173, H02K 7/116, 5/24, 7/08, 5/16; F16C 19/12, 27/08

(56) References Cited

U.S. PATENT DOCUMENTS

| | | | | |
|---|---|---|---|---|
| 4,074,158 A | * | 2/1978 | Cole | 277/410 |
| 4,357,550 A | * | 11/1982 | Muller | 310/43 |
| 4,547,081 A | * | 10/1985 | Tanaka et al. | 384/107 |
| 4,564,335 A | * | 1/1986 | Harmsen et al. | 415/218.1 |
| 4,955,791 A | * | 9/1990 | Wrobel | 417/354 |
| 5,141,338 A | * | 8/1992 | Asada et al. | 384/100 |
| 5,258,672 A | * | 11/1993 | Wrobel | 310/42 |
| 5,715,116 A | * | 2/1998 | Moritan et al. | 310/67 R |
| 5,811,903 A | * | 9/1998 | Ueno et al. | 310/40 MM |
| 5,925,949 A | * | 7/1999 | Jung et al. | 310/254 |
| 6,013,966 A | * | 6/2000 | Fehrenbacher et al. | 310/257 |
| 6,166,889 A | * | 12/2000 | Aoki | 360/267.7 |
| 6,208,046 B1 | * | 3/2001 | Lee | 310/49 R |
| 6,222,291 B1 | * | 4/2001 | Boutaghou | 310/90 |

FOREIGN PATENT DOCUMENTS

JP 01120419 A * 5/1989 ........... F16C/19/12

* cited by examiner

Primary Examiner—Nestor Ramirez
Assistant Examiner—Jaydi Aguirrechea
(74) Attorney, Agent, or Firm—Gudrun E. Huckett

(57) ABSTRACT

A small electric motor has a rotor with a permanent magnet and a shaft having a first end provided with a depression. Axial and radial bearings support the shaft. A bushing receives the first end of the shaft. The axial bearing has a non-magnetic ball positioned in the depression. A side of the ball remote from the shaft runs against a running surface of the bushing. The shaft is magnetically loaded toward the running surface so that the ball is forced against the running surface. The shaft is ferromagnetic and part of a magnetic circuit of the permanent magnet. The ball forms an air gap at the first shaft end. An end face of the shaft facing the air gap forms a magnetic pole that attracts magnetic particles in the area of the axial bearing and keeps them away from the running surface to counteract destruction of running surface and ball.

6 Claims, 1 Drawing Sheet

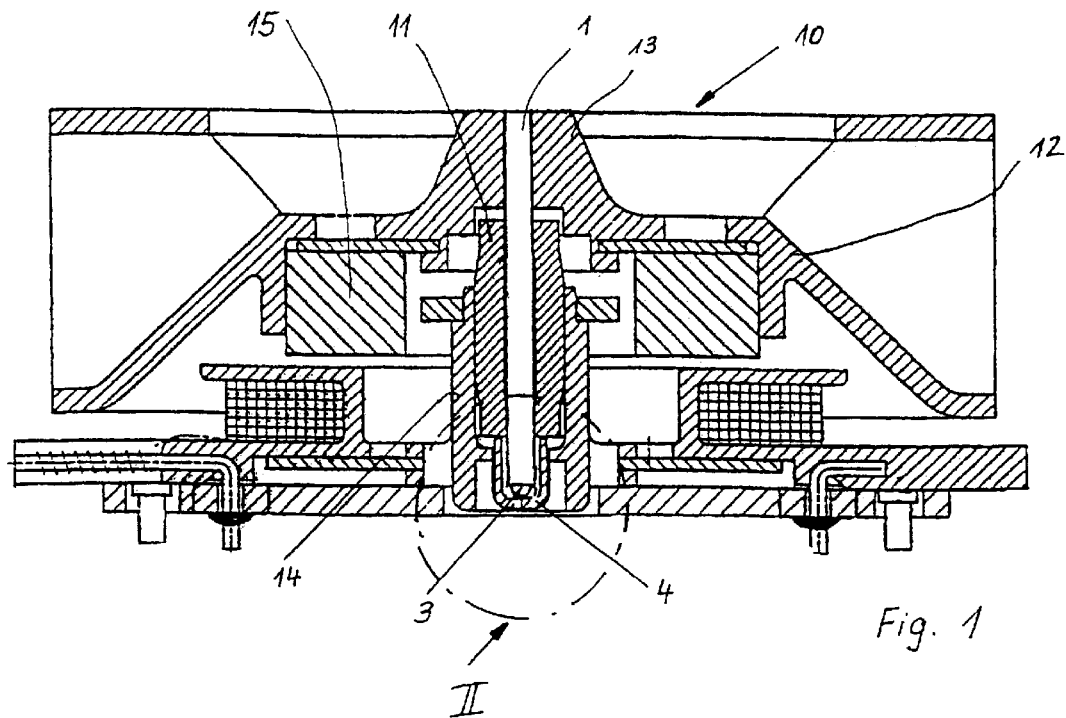
Fig. 1
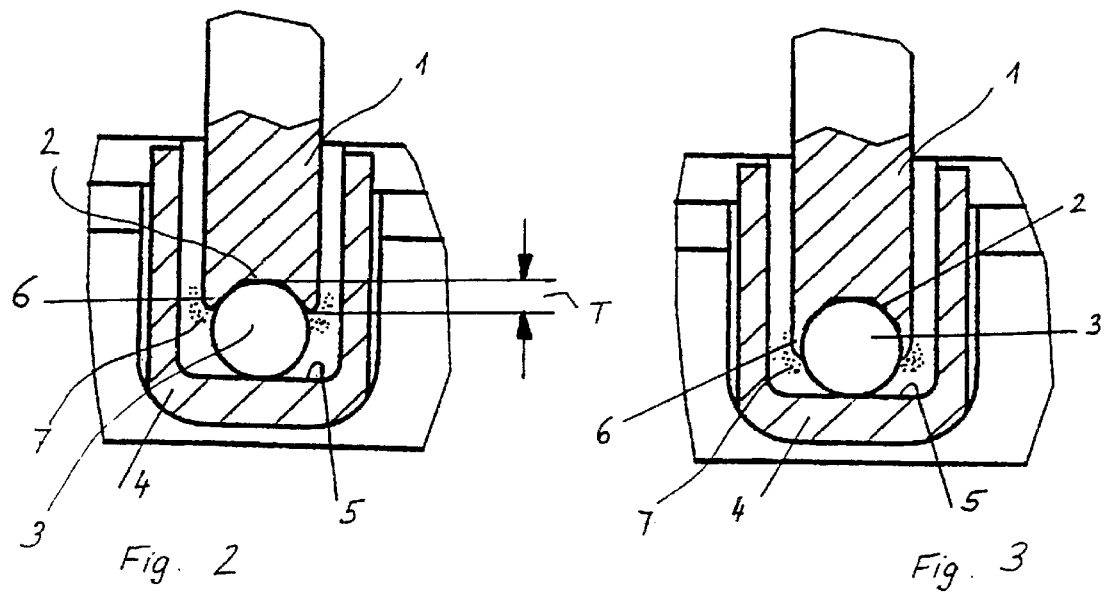
Fig. 2
Fig. 3

SMALL ELECTRIC MOTOR WITH AXIAL BEARING

BACKGROUND OF THE INVENTION

1. Field of the Invention

The invention relates to a small electric motor.

2. Description of Related Art

Known small motors are constructed such that the shafts of the rotors are comprised of steel and have a substantially semi-spherical cap at the shaft end which runs against a contact surface. A disadvantage of such bearings is that the cap of the shaft end acts like a magnetic pole and attracts magnetic particles and, in this way, can damage the bearing location prematurely and finally destroy it. The magnetic pole results from the shaft being comprised of ferromagnetic material and the rotor containing a permanent magnet whose magnetic field closes across the shaft.

Such damaged bearing locations cause strong noises which are not permissible, in particular, in the case of small electric motors running, for example, in air-conditioning devices of motor vehicles.

SUMMARY OF THE INVENTION

It is an object of the invention to provide a bearing which does not have the aforementioned disadvantages.

The solution to this object resides in that the axial bearing comprises a non-magnetic ball which is arranged in a depression centrally provided within one end of the shaft and is guided by the rim of this depression and runs with its side facing away from the shaft against the running surface of a bushing, or in that a depression with a rim is provided at one end of the shaft and a non-magnetic ball is fastened in the depression, wherein the part of the ball projecting from the shaft end runs against a running surface of a bushing. Further details and advantageous developments of the invention result from the embodiments described in the following and illustrated in the drawing.

Further details and advantageous developments of the invention result from the embodiments described in the following and illustrated in the drawing as well as from the dependent claims.

BRIEF DESCRIPTION OF THE DRAWINGS

It is shown in:

FIG. 1 an axial section of one embodiment of a bearing according to the invention in a small ventilator;

FIG. 2 an enlarged illustration of detail II of the embodiment according to FIG. 1; and FIG. 3 a further embodiment of a bearing according to the invention as an enlarged detail view.

DESCRIPTION OF PREFERRED EMBODIMENTS

As an exemplary application a small ventilator 10, as they are used, for example, as a sensor ventilator in air-conditioning devices of motor vehicles, is illustrated in FIG. 1 and is driven by a small motor according to the invention.

This known ventilator 10 is described only to such an extent as is required for this invention. The drive motor of the ventilator 10, preferably an electrically commutated direct current motor, comprises a rotor with a permanent magnet 15 and a ventilator wheel 12 fastened on the rotor and comprising a hub 13 having a shaft 1 fastened in its center.

The shaft 1 is radially supported in a bearing 11 which is mounted in a bearing support tube 14. A ball 3 is placed into a depression 2 provided in one end of the shaft 1. This ball is comprised of a non-magnetic and wear-resistant material such as, for example, stone, ceramic material, plastic material, or metal. Such balls having a high surface quality and a very smooth surface can be procured very inexpensively as mass-produced articles, for example, from the watch and clock making industry, i.e., such a bearing require only minimal extra costs and effects a noise level with respect to the axial bearing action which is no longer audible in connection with such small ventilators.

FIG. 2 shows an enlarged detail of the shaft 1 of steel with the ball 3 which is inserted into the depression 2 of the shaft 1. For facilitating mounting of the ball 3, the depression 2 has an angle of approximately 90° and a depth T of approximately 0.3 of the diameter of the ball. The shaft 1 of the rotor is loaded, as is known in the art, by means of a defined magnetic force in the axial direction and forces in this way the ball 3 against the running surface 5 of a bushing 4 and simultaneously provides an axial securing action of the rotor against falling out, for example, during transport. In this connection, a magnetic pole is formed at one rim 6 which attracts magnetic particles 7, which result from mounting or wear, and these particles 7 are thus kept away from the axial bearing location between the ball 3 and the running surface 5. These particles 7 are generally hard-magnetic particles (for example, from the permanent magnet of the rotor) which cause great wear and thus result in a fast destruction of the bearing locations.

FIG. 3 shows a further embodiment of the inventive bearing. The depression 2 at the end of the shaft 1 is configured in this embodiment such that the ball 3 projects approximately halfway into the end of the shaft. The rim 6 of the depression 2 can secure the ball 3 by means of a caulking. The ball 3 can also be connected by means of an adhesive with the end of the shaft.

The invention is not limited to the illustrated and described embodiments but also comprises all embodiments which act in the same way within the meaning of the invention.

What is claimed is:

1. A small electric motor comprising:

a rotor comprising a permanent magnet (15) and a shaft (1) having a first end provided with a depression (2);

an axial bearing (3, 5) and a radial bearing (11) supporting the shaft (1) axially and radially, respectively;

a bushing (4) receiving the first end of the shaft (1) and having a running surface (5);

wherein the axial bearing (3, 5) comprises a non-magnetic ball (3), wherein the ball (3) is positioned in the depression (2) of the shaft (1) and has a side facing away from the shaft (1) and running against the running surface (5) of the bushing (4);

wherein the shaft (1) is magnetically loaded in a direction toward the running surface (5) of the bushing (4) so that the ball (3) is forced against the running surface (5) of the bushing (4);

wherein the shaft (1) is comprised of a ferromagnetic material and forms a part of a magnetic circuit of the permanent magnet (15) of the rotor;

wherein the ball (3) forms an air gap at the first end of the shaft (1); and wherein an end face of the shaft (1) facing the air gap forms a magnetic pole (6), wherein the magnetic pole (6) attracts magnetic particles (7) in the area of the axial bearing (3, 5) and keeps the magnetic particles (7) away from the running surface (5) to counteract a destruction of the running surface (5) and of the non-magnetic ball (3) by the magnetic particles (7).

2. A small motor according to claim 1, wherein the ball (3) is comprised of stone material.

3. A small motor according to claim 1, wherein the ball (3) is comprised of ceramic material.

4. A small motor according to claim 1, wherein the ball (3) is comprised of plastic material.

5. A small motor according to claim 1, wherein the ball (3) has a smooth surface.

6. A small ventilator comprising a small electric motor according to claim 1.

* * * * *